US007703014B2

(12) United States Patent
Funaki

(10) Patent No.: US 7,703,014 B2
(45) Date of Patent: Apr. 20, 2010

(54) APPARATUS AND COMPUTER PROGRAM FOR ARRANGING MUSIC SCORE DISPLAYING DATA

(75) Inventor: Tomoyuki Funaki, Hamamatsu (JP)

(73) Assignee: Yamaha Corporation (JP)

( * ) Notice: Subject to any disclaimer, the term of this patent is extended or adjusted under 35 U.S.C. 154(b) by 864 days.

(21) Appl. No.: 10/728,529

(22) Filed: Dec. 5, 2003

(65) Prior Publication Data

US 2004/0112201 A1 Jun. 17, 2004

(30) Foreign Application Priority Data

Dec. 5, 2002 (JP) ............................. 2002-353519

(51) Int. Cl.
*G09B 15/02* (2006.01)

(52) U.S. Cl. ...................................... 715/269; 84/483.2

(58) Field of Classification Search ................... 84/453, 84/470 R, 483.2, 609, 483.1, 477 R; 984/300, 984/301, 302

See application file for complete search history.

(56) References Cited

U.S. PATENT DOCUMENTS

| | | | | |
|---|---|---|---|---|
| 5,038,659 | A * | 8/1991 | Satoh et al. | 84/462 |
| 5,146,833 | A * | 9/1992 | Lui | 84/462 |
| 5,524,522 | A * | 6/1996 | Hesnan | 84/473 |
| 5,962,800 | A * | 10/1999 | Johnson et al. | 84/483.2 |
| 6,545,208 | B2 * | 4/2003 | Hiratsuka | 84/476 |
| 6,660,922 | B1 * | 12/2003 | Roeder | 84/477 R |
| 6,751,439 | B2 * | 6/2004 | Tice et al. | 434/350 |
| 7,030,307 | B2 * | 4/2006 | Wedel | 84/477 R |
| 7,119,266 | B1 * | 10/2006 | Bittner et al. | 84/477 R |
| 7,220,909 | B2 * | 5/2007 | Funaki | 84/609 |
| 2001/0023633 | A1 * | 9/2001 | Matsumoto | 84/478 |
| 2001/0045154 | A1 * | 11/2001 | Aoki | 84/609 |

(Continued)

FOREIGN PATENT DOCUMENTS

JP 1048064 A 2/1989

(Continued)

OTHER PUBLICATIONS

Dr. Jody Nagel, "Computer Music-Notation Software", Mar. 1997.*

(Continued)

*Primary Examiner*—William L Bashore
*Assistant Examiner*—Ece Hur
(74) *Attorney, Agent, or Firm*—Rossi, Kimms & McDowell LLP

(57) ABSTRACT

A music score display data arranging unit provides music score display data for displaying a music score by placing music score notational elements on a given display area in one or more staff tiers, each staff tier containing one or more measures of variable lengths based on inputted music performance representing data. The sizes of the music score notational elements and the size of the display area are determinable. A measures apportioning unit calculates, for each measure based on the sizes of the music score notational elements, a minimum horizontal length for placing at least one kind of notational elements in the measure without an overlap in the horizontal direction, and apportions a number of measures in each staff tier such that the notational elements of each measure shall be placed on the apportioned staff tier in a length of the calculated minimum horizontal length or more.

10 Claims, 8 Drawing Sheets

U.S. PATENT DOCUMENTS

| | | | | |
|---|---|---|---|---|
| 2004/0007118 | A1* | 1/2004 | Holcombe | 84/483.2 |
| 2004/0069115 | A1* | 4/2004 | Hiratsuka et al. | 84/483.1 |
| 2004/0074376 | A1* | 4/2004 | Varme | 84/483.2 |
| 2004/0094017 | A1* | 5/2004 | Suzuki et al. | 84/609 |
| 2006/0065100 | A1* | 3/2006 | Funaki | 84/471 R |

FOREIGN PATENT DOCUMENTS

| | | | | |
|---|---|---|---|---|
| JP | 04022636 | A | * | 1/1992 |
| JP | 10-198352 | A | | 7/1998 |
| JP | 2002-258837 | A | | 9/2002 |

OTHER PUBLICATIONS

Presentation of Information issued for the corresponding Japanese patent application No. 2002-353519, submitted Oct. 30, 2006.

Office Action issued in corresponding Japanese application No. 2002-353519, Oct. 16, 2006.

* cited by examiner

*Fig. 1* Functional Configuration

*Fig.3a* Notational Element
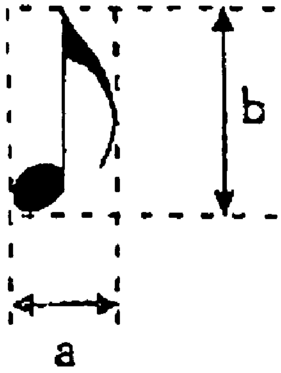
*Fig.3b* Notational Element Sizes
| Display Size | p1 | p2 | p3 |
|---|---|---|---|
| Horizontal Length a | 8 | 10 | 12 |
| Vertical Length b | 12 | 15 | 18 |

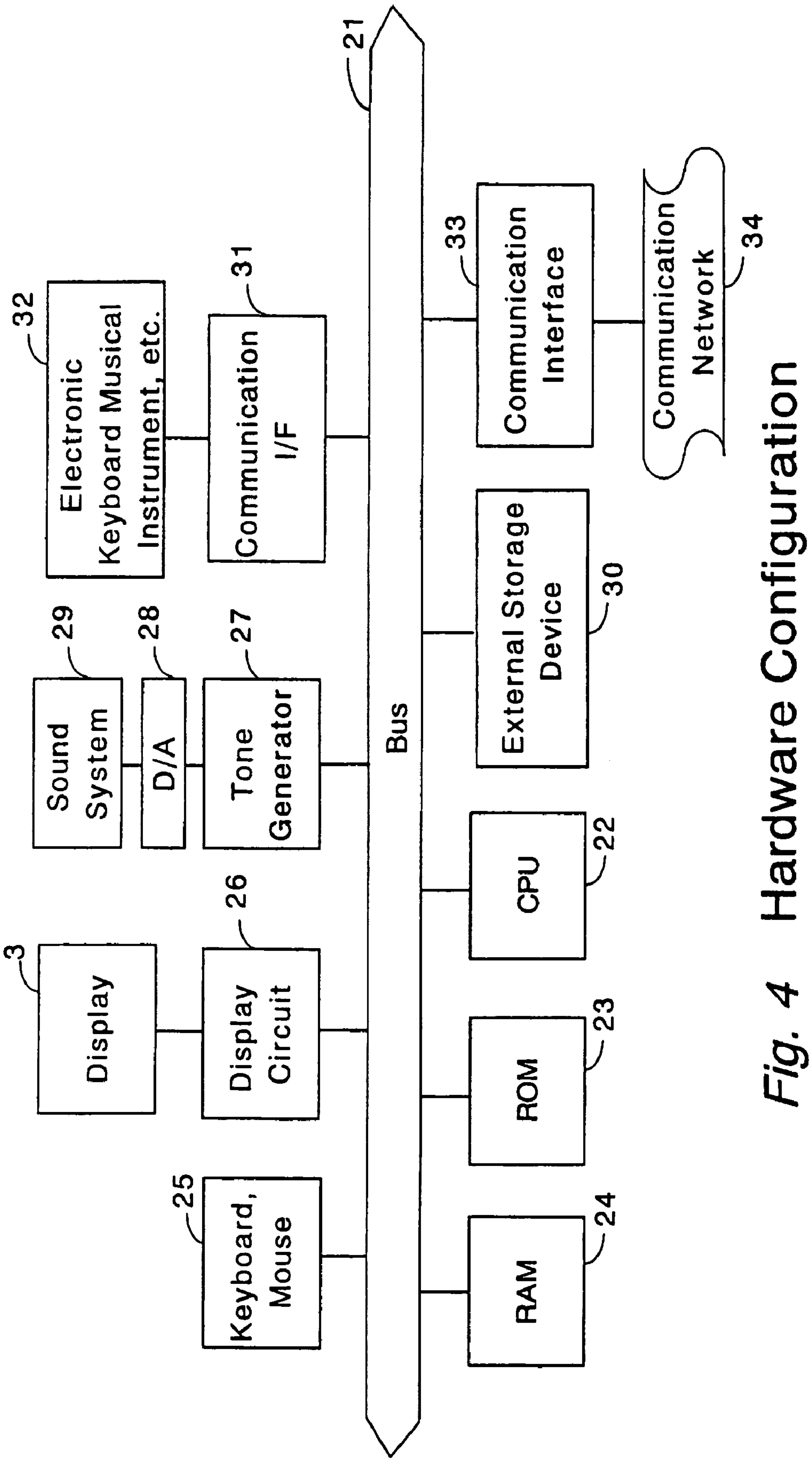
*Fig. 4* Hardware Configuration

*Fig. 5a* Determining Horizontal Lengths of Measures
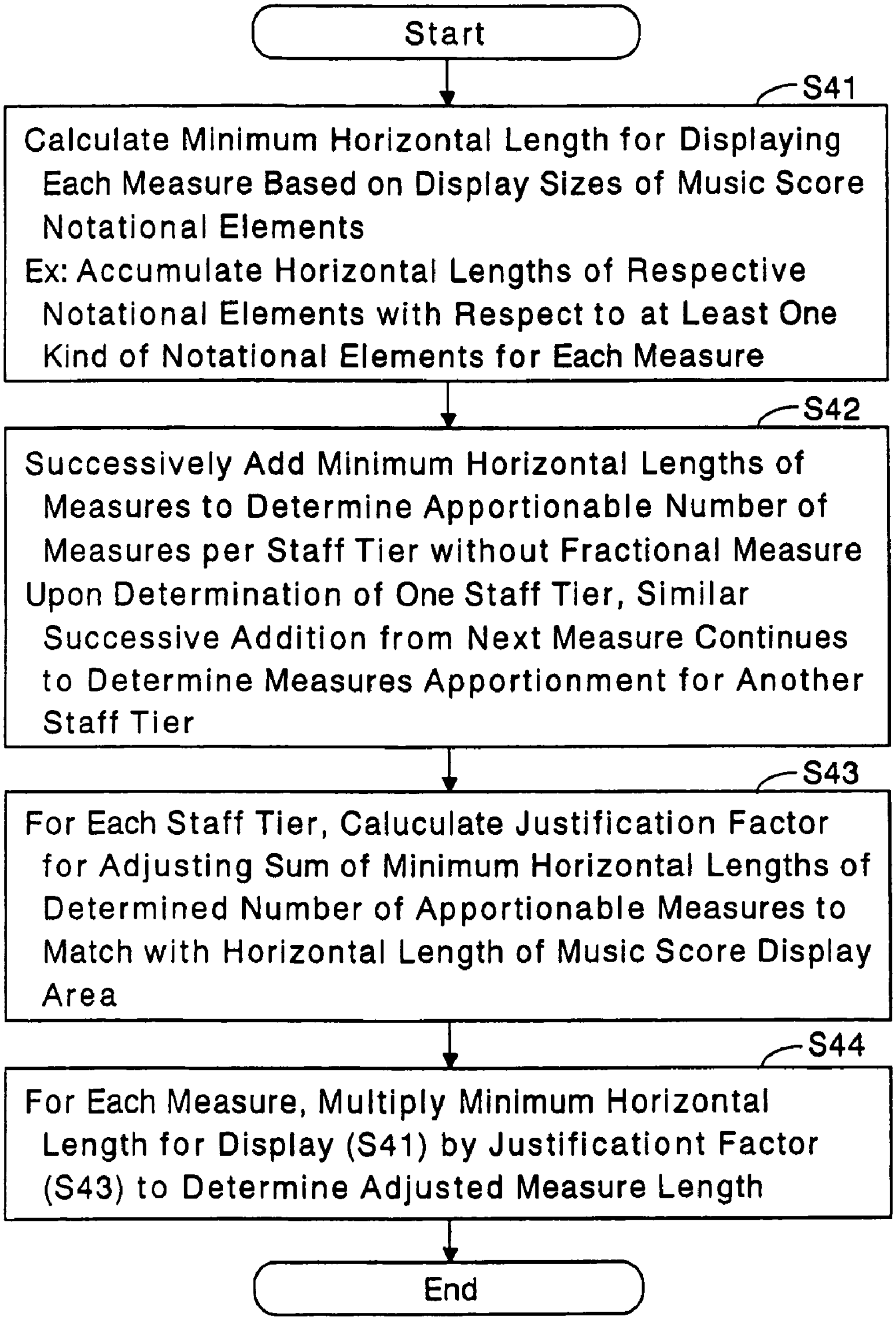

*Fig. 5b* Examples of Calculation

Horizontal Length of Music Score Area: 200 dots — 50

| | | |
|---|---|---|
| Measure 1: | 59 dots | 51 |
| Measure 2: | 89 dots | |
| Measure 3: | 105 dots | |
| Measure 4: | 63 dots | |
| Measure 5: | 88 dots | |
| • • • | • • • | |

| | | |
|---|---|---|
| Staff Tier 1, Measures 1-2: | 148 dots | 52 |
| Staff Tier 2, Measures 3-4: | 168 dots | |
| Staff Tier 3, Measures 5-k: | xxx dots | |
| • • • | • • • | |

| | | |
|---|---|---|
| Staff Tier 1: | 200/148 = 1.351 • • • | 53 |
| Staff Tier 2: | 200/168 = 1.190 • • • | |
| Staff Tier 3: | 200/xxx = y.yyy • • • | |
| • • • | • • • | |

| | | | |
|---|---|---|---|
| Measure 1: | 59 × 1.351 = 80 dots | grouped | 54 |
| Measure 2: | 89 × 1.351 = 120 dots | | |
| Measure 3: | 105 × 1.19 = 125 dots | grouped | |
| Measure 4: | 63 × 1.19 = 75 dots | | |
| Measure 5: | 88 × y.yyy = zz dots | | |
| • • • | • • • | | |

*Fig. 6a* Determining Heights of Staff Tiers
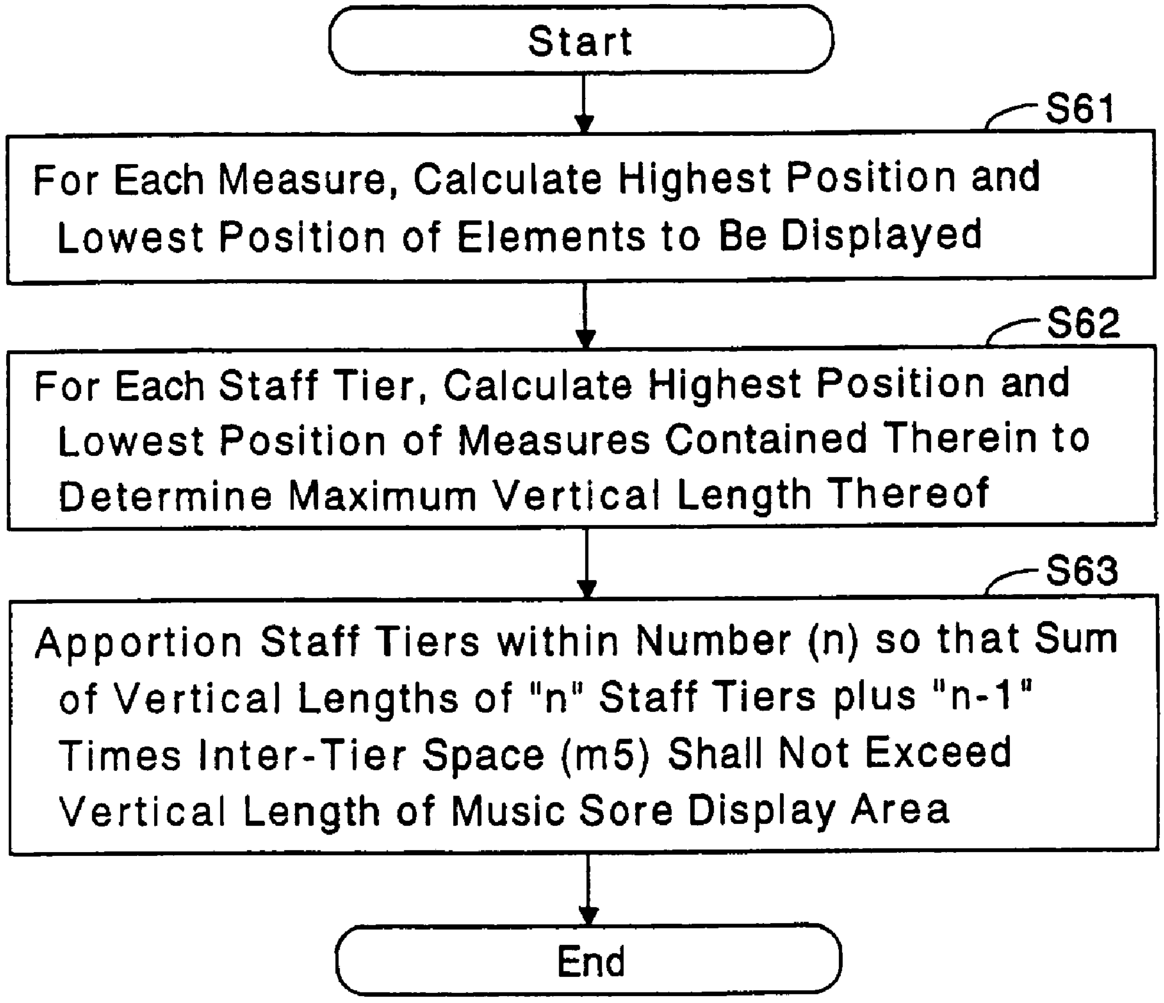

*Fig. 6b* Examples of Calculation
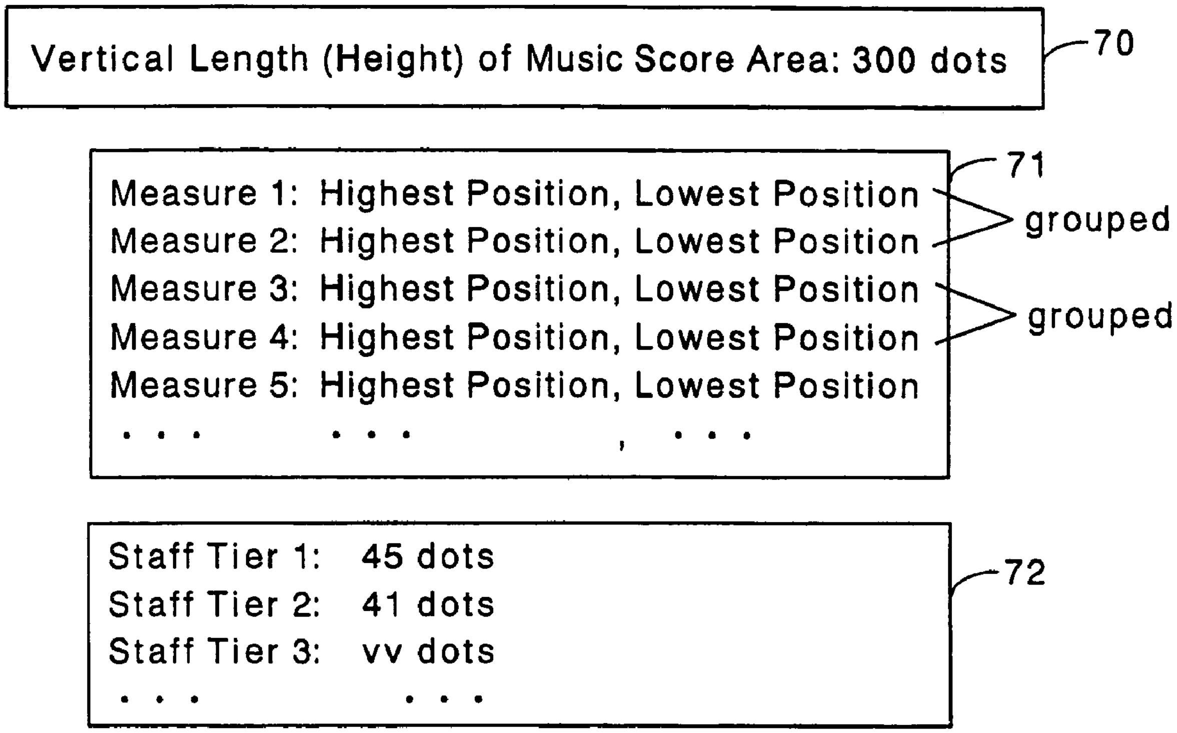

APPARATUS AND COMPUTER PROGRAM FOR ARRANGING MUSIC SCORE DISPLAYING DATA

TECHNICAL FIELD

The present invention relates to an apparatus and a computer program for arranging music score displaying data, and more particularly to an apparatus and a computer program for arranging music score displaying data with which a music score is displayed on a display device in justified apportionments of the measures and the staff tiers within a given music score display area, combining notational elements for a music score.

BACKGROUND INFORMATION

An apparatus which composes music score displaying data from the inputted musical performance representing data and displays a corresponding music score on a display screen is known in the art, as disclose, for example, in unexamined Japanese patent publication No. H10-198352.

A music score is displayed or printed by placing various musical notational elements or parts on staves of five lines. The notational element or parts refer to symbols, signs, marks and other indications for the musical notation such as clefs (G clef, F clef and C clef), bar lines, key signatures, time signatures, notes, rests, dynamic marks, repeat signs which are placed on the staves to visually describe music. Staves may be also termed as elements or parts.

The size of an element refers to the dimensions of the element which is displayed or exhibited on a display screen or on a sheet of paper to constitute a music score. In the above referenced patent publication (paragraph [0087]), the size of the notational elements is defined as the font size that is one tenth (1/10) of a measure size (i.e. height) $V_M$ which is obtained by dividing the size (i.e. vertical length) $V_W$ of the music score display area (or window) by the number n of tiers of the staves.

In this specification, a staff tier means a tier of music notation describing a music progression on a staff of five lines. The area of a staff tier also covers spaces for ledger lines above and below the five lines. In the case of a grand staff consisting of a five-line staff with a G clef and a five-line staff with an F clef placed in parallel and connected together vertically, or in the case of an orchestra score consisting of staves for various instrument parts, a group of staves for a simultaneous music progression may be termed as a staff tier.

The above referenced patent publication discloses (in connection with FIGS. 4, 6 and 13) an apparatus for creating music score display data to display a sheet music on a display screen based on the number of measures to be contained in each staff tier and the number of staff tiers to be contained in a page of the score as set by a user.

The above referenced patent publication also discloses (in connection with FIGS. 14 and 19) an example in which the number of measures and the sizes of the music score notational elements are respectively designated. The above referenced patent publication further discloses (in connection with FIGS. 20 and 26) an example in which the number of measures, the number of staff tiers and the sizes of the notational elements are designated, and the priority among those designations can be also designated.

In a known software product (sold by YAMAHA), which is a sequencer software product for a personal computer, the sizes of the notational elements are selectable among four ranks (large, middle, small, tiny) in a music score display window. During an automatic play back of the musical performance data, the displayed range of the music score is changed to the next range when the music progresses beyond the displayed range. When the scroll bar on the display screen is moved by the mouse, the displayed range of the music score is scrolled accordingly. The length (horizontal dimension) of a measure is of a fixed size irrespective of the sizes of the notational elements employed.

In both of the prior art embodiments, the number of notational elements such as notes to be placed in a measure varies from one measure to another. Further, the horizontal lengths of the notational elements to be placed vary among different kinds of notational elements. In this connection, as the number of notational elements to be placed in a measure is large, the notational elements may overlap with each other so that the music score will be less legible. Under such a circumstance with the above referenced patent publication, the designation of the number of measures will have to be changed, or the sizes of the notational elements will have to be changed to a smaller size. On the other hand, with the above referenced software product, the display magnification factor in the horizontal direction will have to be enlarged by clicking the horizontal zoom-in button by the mouse. Namely, the adjustment for better legibility of the notational elements on the musical staves will not be conducted automatically. Further, in the case of the above referenced patent publication (FIGS. 15 and 17), where a plurality of staff tiers are displayed on one page of a sheet music, the designation of larger sizes of notational elements will cause the notational parts of the vertically adjacent staff tiers may overlap with each other, and consequently the user will have to change the designation of the sizes.

SUMMARY OF THE INVENTION

It is, therefore, a primary object of the present invention to solve the drawbacks with the conventional apparatus and software product, and to provide a novel type of apparatus and computer program for arranging music score displaying data, in which the positioning of the music score notational elements is automatically determined according to the sizes of the notational elements so that the notational elements are easily recognized and read by the user.

According to the present invention, the object is accomplished by providing an apparatus for arranging music score displaying data for displaying a music score on a given music score display area in one or more staff tiers, each tier containing one or more measures of variable lengths as justified for the display area, the apparatus comprising: a music performance representing data input device which inputs data representing a music performance in a plurality of measures of music progression; a musical score notational element determining device which determines music score notational elements necessary for displaying a music score for each of the measures based on the music performance representing data; a display size determining device which determines display sizes of the music score notational elements to be displayed on the display area; a horizontal length determining device which determines a horizontal length of the music score to be displayed on the display area; a measures apportioning device which calculates, for each of the measures based on the determined display sizes, a minimum horizontal length for placing in the measure at least one kind of the music score notational elements without an overlap in a horizontal direction among the music score notational elements as determined to be displayed for each of the measures, and apportions the measures for each of the staff tiers based on the calculated minimum horizontal length of each of the measures and the determined horizontal length of the music score to be displayed such that the music score notational elements of each of the measures shall be placed on the apportioned staff tier in a length of the minimum horizontal length or more, measure by measure; and a music score display data output device which outputs music score display data for displaying the music score notational elements on the staff tiers according to the apportionment of the measures by the measures apportioning device. Thus, the positioning of the notational elements is automatically adjusted so that the notational elements of at least one kind should be placed without an overlap with each other in the horizontal direction and that a measure should not extend from one tier over to the next tier, and consequently the notational elements on the staff tier will be easily recognized and read by the user. The same is true, even if the display sizes are changed.

In an aspect of the present invention, the music score notational elements are of at least one kind selected from clefs, bar lines, key signatures, time signatures, notes, rests, dynamic marks, repeat signs and staff lines.

In a further aspect of the present invention, the display size determining device includes controls to be operated by a user for determining the display sizes of the music score notational elements.

In a still further aspect of the present invention, the music score is to be displayed in tiers of musical staves on a page or pages, each page having the music score display area, and the apparatus further comprises: a vertical length determining device which determines a vertical length of the music score to be displayed on the display area; and a staff tiers apportioning device which calculates, for each of the staff tiers based on the determined display sizes, a maximum vertical length for placing all the music score notational elements in the measures apportioned for the staff tier by the measures apportioning device, and apportions the staff tiers for the page based on the calculated maximum vertical length of each of the staff tiers and the determined vertical length of the music score to be displayed such that a number of staff tiers shall be placed within the music score display area on the page; wherein the music score display data output device outputs music score display data for displaying the music score for the page by placing the music score notational elements in the staff tiers for which the measures are apportioned by the measures apportioning device according to the apportionment of the staff tiers as apportioned by the staff tiers apportioning device. Thus, the notational elements are placed within the vertical range of each staff tier, and the positioning of the staff tiers is automatically adjusted so that one staff tier should not be divided between two pages, and consequently the notational elements on the staff tier will be easily recognized and read by the user. The same is true, even if the display sizes are changed.

In a still further aspect of the present invention, the staff tiers apportioning device calculates the maximum vertical length by calculating the highest position of an notational element and the lowest position of an notational element among the notational elements to be placed in each of the staff tiers.

According to the present invention, the object is further accomplished by providing an apparatus for arranging music score displaying data for displaying a music score having measures of music progression on a display device, the apparatus comprising: a music performance representing data input device which inputs data representing a music performance in a plurality of measures of music progression; a display size determining device which determines display sizes of music score notational elements with respect to the measures to be displayed on the display device based on the music performance representing data; a measures length calculating device which calculates, for each of the measures based on the determined display sizes of the music score notational elements, a horizontal length of the measure for placing in the measure at least one kind of the music score notational elements without an overlap in a horizontal direction among the music score notational elements; and a music score display data output device which outputs music score display data for displaying the music score notational elements in the measures according to the determined display sizes of the music score notational elements and the calculated horizontal lengths of the measures. Thus, the notational elements of at least one kind should be placed without an overlap with each other in the horizontal direction, and consequently the notational elements on the staff tier will be easily recognized and read by the user. The same is true, even if the display sizes are changed.

In a still further aspect of the present invention, the apparatus further comprises: a display adjusting device which adjusts the music score display data such that a music score is displayed in a plurality of staff tiers on the display device on a page-by-page basis, apportions the measures among the staff tiers such that a single measure shall not extend over two staff tiers, and apportions the music score notational elements to be placed in a uniform distribution through the staff tier with respect to the music progression.

According to the present invention, the object is still further accomplished by providing a computer program containing program instructions executable by a computer for arranging music score displaying data for displaying a music score on a given music score display area in one or more staff tiers, each tier containing one or more measures of variable lengths as justified for the display area, and causing the computer to execute: a music performance representing data input step of inputting data representing a music performance in a plurality of measures of music progression; a musical score notational element determining step of determining music score notational elements necessary for displaying a music score for each of the measures based on the music performance representing data; a display size determining step of determining display sizes of the music score notational elements to be displayed on the display area; a horizontal length determining step of determining a horizontal length of the music score to be displayed on the display area; a measures apportioning step of calculating, for each of the measures based on the determined display sizes, a minimum horizontal length for placing in the measure at least one kind of the music score notational elements without an overlap in a horizontal direction among the music score notational elements as determined to be displayed for each of the measures, and apportioning the measures for each of the staff tiers based on the calculated minimum horizontal length of each of the measures and the determined horizontal length of the music score to be displayed such that the music score notational elements of each of the measures shall be placed on the apportioned staff tier in a length of the minimum horizontal length or more, measure by measure; and a music score display data output step of outputting music score display data for displaying the music score notational elements on the staff tiers according to the apportionment of the measures by the measures apportioning step.

According to the present invention, the object is still further accomplished by providing a computer program containing program instructions executable by a computer for arranging music score displaying data for displaying a music score having measures of music progression on a display device, and causing the computer to execute: a music performance representing data input step of inputting data representing a music performance in a plurality of measures of music progression; a display size determining step of determining display sizes of music score notational elements with respect to the measures to be displayed on the display device based on the music performance representing data; a measures length calculating step of calculating, for each of the measures based on the determined display sizes of the music score notational elements, a horizontal length of the measure for placing in the measure at least one kind of the music score notational elements without an overlap in a horizontal direction among the music score notational elements; and a music score display data output step of outputting music score display data for displaying the music score notational elements in the measures according to the determined display sizes of the music score notational elements and the calculated horizontal lengths of the measures.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other.

BRIEF DESCRIPTION OF THE DRAWINGS

For a better understanding of the present invention, and to show how the same may be practiced and will work, reference will now be made, by way of example, to the accompanying drawings, in which:

FIG. 3*a* is a chart showing an example of a music score notational element;

FIG. 3*b* is a table showing examples of sizes of the music score notational element shown in FIG. 3*a;*

FIG. 4 is a block diagram illustrating the hardware configuration of an embodiment of an apparatus for arranging music score displaying data according to the present invention;

FIG. 5*a* is a flow chart describing the process steps for determining the horizontal lengths of the measures in the computer program executed for arranging the music score displaying data according to the present invention;

FIG. 5*b* is a chart showing examples of calculations performed in the respective steps of FIG. 5*a;*

FIG. 6*a* is a flow chart describing the process steps for determining the vertical lengths of the staff tiers in the computer program executed for arranging the music score displaying data according to the present invention; and FIG. 6*b* is a chart showing examples of calculations performed in the respective steps of FIG. 6*a.*

DETAILED DESCRIPTION OF EMBODIMENTS OF THE INVENTION

Figure 1:
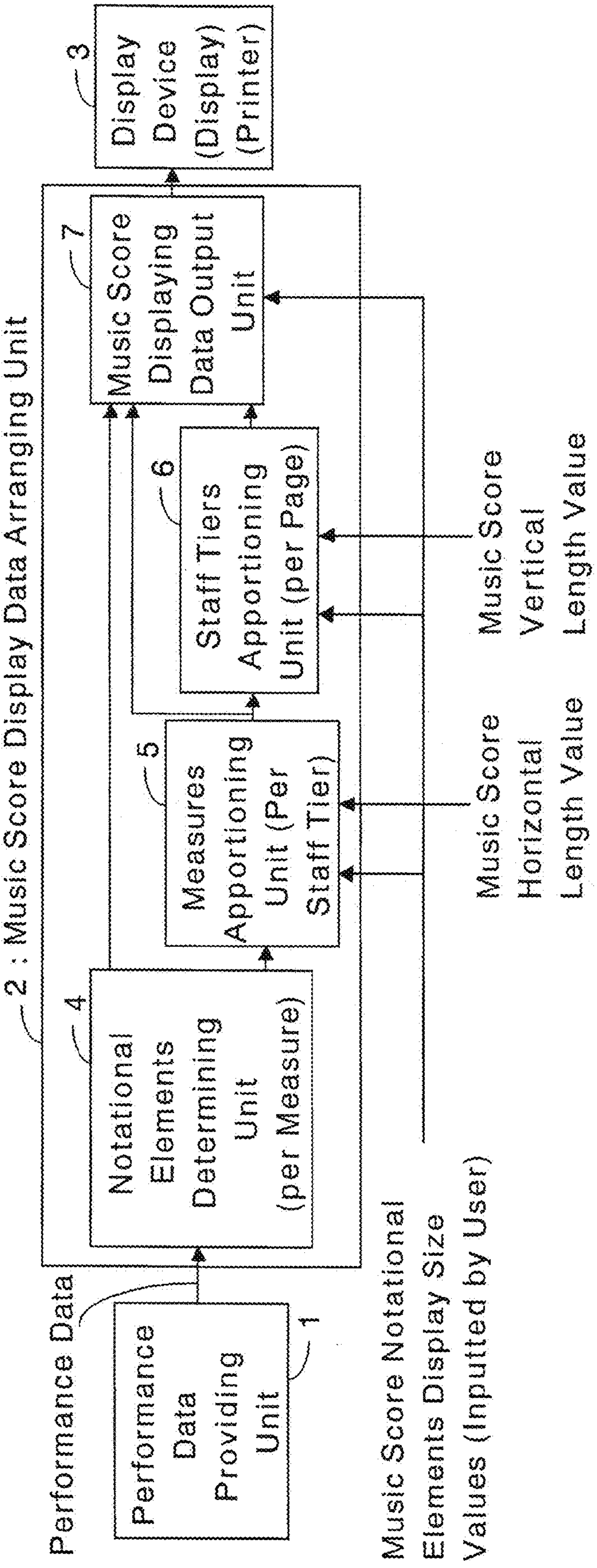
FIG. 1 is a block diagram illustrating the functional configuration of an embodiment of an apparatus for arranging music score displaying data according to the present invention.

FIG. 1 shows a block diagram illustrating the functional configuration of an embodiment of an apparatus for arranging music score displaying data according to the present invention. As shown in FIG. 1, the apparatus for arranging music score displaying data comprises a musical performance data providing unit 1, a music score displaying data arranging unit 2 and a display device (display or printer) 3. The music score displaying data arranging unit 2 includes a music score notational elements determining unit 4, a measures apportioning unit 5, a staff tiers apportioning unit 6 and a music score displaying data output unit 7. The music score displaying data outputted for the printer may be stored in a storage device not shown. The performance data providing unit 1 is a storage device which stores music performance data files representing pieces of music in the SMF (standard MIDI file) format or else. The storage device may, for example, be such a storage device as a ROM (read-only memory), a semiconductor memory card and a hard disk equipped in an electronic musical instrument, or may be an external storage device provided outside the apparatus, or may be a RAM (random access memory) for storing the performance data read out from those storage devices mentioned above in this paragraph.

The music score display data arranging unit 2 is to compose a data file for displaying a music score representing the music of the performance data on a display area of the display device 3 by arranging the performance data inputted from the performance data providing unit 1. The music score is comprised of one or more staff tiers, each staff tier containing one or more measures, according to the set values for the sizes of the music score notational elements, the set value for the horizontal length of the music score and the set value for the vertical length of the music score. These values, for example, the values for the sizes of the notational elements can be set by the user by manipulating the controls. The values for the horizontal length and the vertical length of the music score may be preset values according to the display size of the display device 3.

Figure 2:
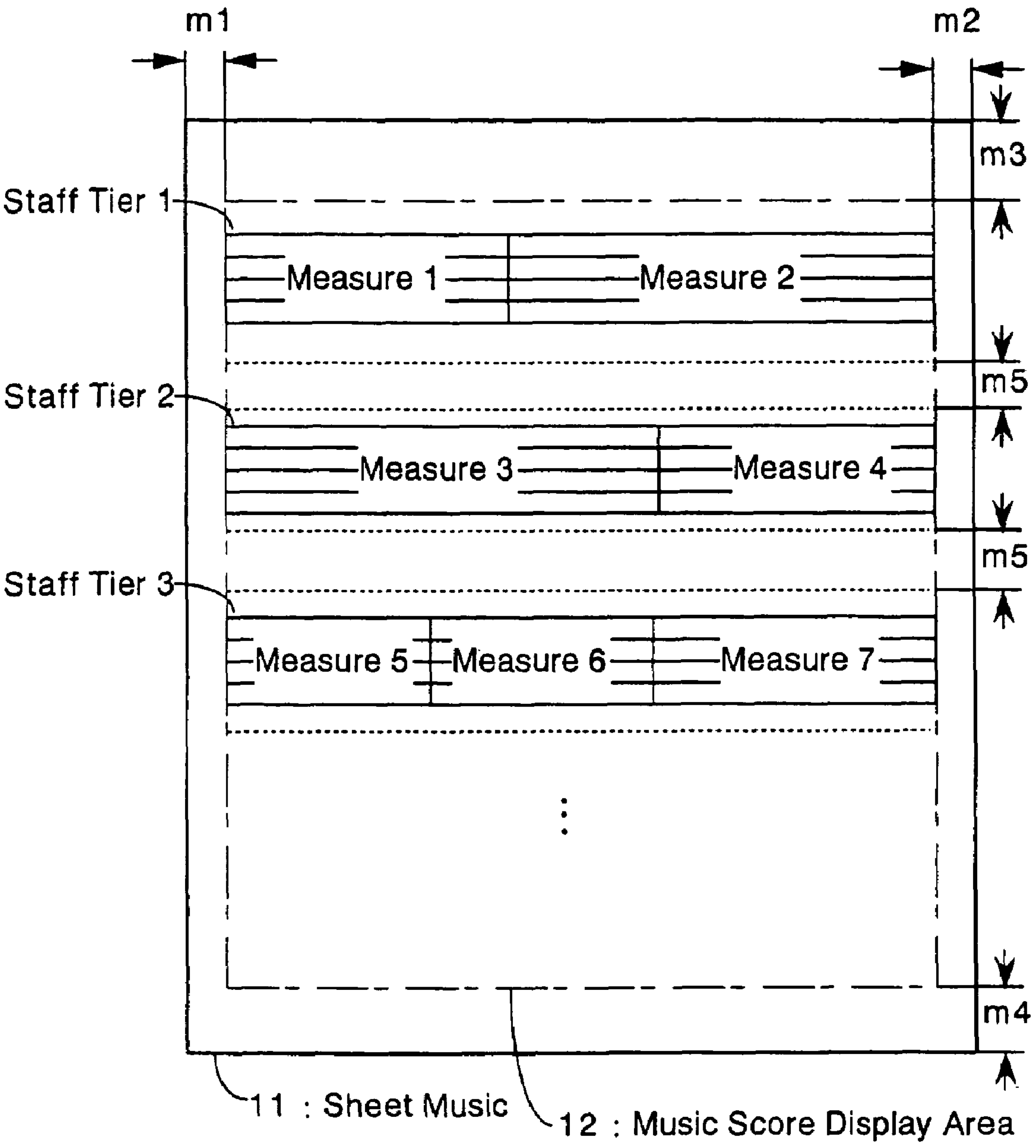
FIG. 2 is a chart showing an example of a sheet music displayed on a display device.

FIG. 2 is a chart showing an example of a sheet music displayed on the display device 3. The reference numeral 11 denotes one page of sheet music having peripheral margins (left side: m1, right side: m2, top end: m3 and bottom end: m4) to define a music score display area 12 inside the margins. The display area 12 contains one or more staff tiers (staff tier 1, staff tier 2, staff tier 3, and so forth) positioned from the top toward the bottom. The horizontal and vertical lengths of the sheet music may be fixed values or may be variable values to be set by the user. The horizontal length of the music score is the horizontal length of the display area 12, and the vertical length of the music score is the vertical length of the display area 12.

Each staff tier has five lines for the staff and the upper and lower spaces for placing notes with ledger lines, and contains one or more measures of various length. The illustrated example contains seven measures #1 through #7 positioned on three staff tiers #1 through #3, in which the lengths of the measures are different and the number of measures per staff tier may be different from one tier to another. Where there are plural tiers of staves, there may be provided inter-tier margins m5 as shown in FIG. 2. As the musical performance progresses, the performance position on the music score proceeds from the upper tier to the lower tier. When the music score cannot be displayed on a single sheet music 11, the next page displays the continuing score portion. The display screen 3 may display two adjacent pages in a spread frame. A title of music and a copyright indication may be displayed in the upper peripheral margin m3, and a page number may be displayed in the lower peripheral margin m4. Where the sheet music 11 is displayed in a screen window of an application software, the size of the screen window may be variable, but the following description will be made such that the size of the sheet music 11 is to be set independently from the size of the screen window.

FIG. 3*a* shows an example of a music score notational element, and FIG. 3*b* shows examples of sizes of the notational element shown in FIG. 3*a*. The music score notational elements or parts are symbols, signs, marks and other indications for the musical notation such as clefs (G clef, F clef and C clef), bar lines, key signatures, time signatures, notes, rests, dynamic marks, repeat signs which are placed on the staves to visually describe music. Staves may be also termed as elements or parts. The size of an element refers to the dimensions of the element which is displayed or exhibited on a display screen or on a sheet of paper to constitute a music score. Every element may preferably be prepared in several sizes. The example of FIG. 3*b* prepares three ranks P1, P2 and P3 of sizes. Once the display size rank is selected, the sizes of various notational elements are to be determined uniformly.

The example of notational element shown in FIG. 3*a* is an eighth note. The horizontal and vertical dimensions a and b are determined according to the selection of the display size rank. The horizontal dimension "a" and the vertical dimension "b" are expressed, for example, in terms of the number of dots (pixels) used to constitute the notational element. The values will be different for different kinds of notational elements of the same display size rank. The table as shown in FIG. 3*b* may be prepared and stored separately for different kinds of notational elements or may be incorporated previously in the processing program. Alternatively, the horizontal dimension a and the vertical dimension b may be captured, when the image data for display are obtained upon designation of the notational element and the display size rank, or may be detected from the image data per se. The spaces among the five lines are to be varied according to the display size rank and coincides with the vertical dimension of the head of the note.

Where a font set of musical symbols are used, the display size rank can be designated by a font size (point value). Once a font size is designated, the display sizes of various notational elements will be set uniformly, but some adjustments may be made by precisely modifying the point values or by employing different font sets with adjustment for different notational elements depending on the kinds of the notational elements, thereby balancing the displayed sizes. With some font sets, the vertical lengths are uniformly determined according to the point values, while the horizontal lengths are different for individual fonts of the same point value. In most of the cases, the horizontal dimension and the vertical dimension of the musical symbol fonts include marginal spaces around the symbols in addition to the sizes a and b themselves of the notational elements. In some of the musical symbol fonts, a single symbol can be built by combining plural fonts. For example, a note may be composed by combining a head, a stem, a flag and a dot. But in such a case, the composed symbol is termed as a notational element in this specification.

The notational elements determining unit 4 receives the inputted performance data and determines, measure by measure, the notational elements necessary to display the music score based on the performance data. The performance data set contains note data (note-on, note-off) and some metaevents (copyright indication, title of the music piece, word metaevent set, tempo, meter, key, etc.). These are indicated on the music score as the musical symbols. The notational elements for displaying these musical symbols are determined based on the performance data with corresponding to the musical symbols. As the notational elements determining unit 4 determines the notational elements for each of the measures, measure by measure, the partitions between the adjacent measures should be known for the processing. In case the inputted performance data file includes metaevents indicating bar lines, the partitions between the adjacent measures can be known by detecting such metaevents. In case such a metaevent is not included, the positions of bar lines can be obtained from the time signature, the notes and the rests contained in the performance date file.

The measures apportioning unit 5 calculates the positions to place the notational elements for the measure as determined by the notational elements determining unit 4 within the measure, in the first place. First, the measures apportioning unit 5 calculates the minimum horizontal length necessary to place at least one kind of notational elements consecutively in the horizontal direction, namely without an overlap, for each of the measures. Each of the calculated horizontal minimum lengths is the minimum horizontal length of each of the measure to constitute the music score. At least one kind of notational elements includes such symbols as notes, accidentals, rests, clefs, key signature and time signature. Where a key signature or a time signature is not placed in the staff tier, they are omitted from the calculation. The tie and the slur may sometimes overlap with the notes. Accordingly, not all the notational elements are prohibited from a horizontal overlap. Where the words are also displayed, the spelled words may sometimes become longer in the horizontal direction than the sequential placing of the notes. In such a case, the minimum horizontal length for each measure is calculated also with respect to the character string of the words for the horizontal placing of the characters without an overlap. And, then the minimum horizontal length with respect to the words is compared with the minimum horizontal length with respect to the musical symbols, and the longer of the two is employed as the minimum horizontal length of the measure.

Then, for each of the staff tier, a number of measures are allotted or apportioned such that every measure containing all the notational elements of the measure shall be placed with a horizontal length same as or longer than the calculated minimum horizontal length of the measure within a staff tier. Thus a staff tier contains one or more complete (i.e. not fractional) measures of various length. As the sum of the minimum horizontal lengths of the respective apportioned measures is, in most of the cases, shorter than the horizontal length of the staff tier, the horizontal length of each measure is enlarged such that the sum of the minimum horizontal lengths of the apportioned measures becomes the horizontal length of the staff tier (i.e. horizontal length of the music score display area 12). Thus, the notational elements are allotted to the respective staff tiers, and the positioning of the notational elements are adjusted automatically such that a measure shall not extend over to the succeeding staff tier. A specific processing for apportioning measures will be described herein later with reference to FIGS. 5*a* and 5*b*.

The staff tiers apportioning unit 6, in the first place, calculates a maximum vertical length for placing all the notational elements apportioned in each measure contained in each of the staff tiers by the measures apportioning unit 5. Then, the staff tiers are successively allotted to or apportioned in each page such that every complete (not fractional) staff tier shall be placed within a page based on the calculated maximum vertical length of each staff tier and the vertical length of the music score. A specific processing for apportioning staff tiers will be described herein later with reference to FIGS. 6*a* and 6*b*.

The music score displaying data output unit 7 creates music score displaying data for displaying the notational elements on the respective staff tiers according to the apportioning of the measures by the measures apportioning unit 5. For example, the vertical positions of the notes are determined based on the note data extracted from the performance data file. With respect to the horizontal positioning, horizontal positioning data are obtained such that at least one kind of notational elements such as notes shall be placed without an overlap in the horizontal direction. Then, the horizontal positioning data are widened horizontally according to the enlarging factor at the processing of enlarging the horizontal length of the measure such that the sum of the horizontal lengths of the measures apportioned to the tier will become the horizontal length of the music score (i.e. the horizontal length of the music score display area 12). This may be termed as the horizontal justification of the notational elements in the measure. Next, the music score displaying data are outputted for displaying the notational elements in the measures apportioned in the staff tier by the measures apportioning unit 5 within the music score display area 12 of each page according to the apportioning of the staff tiers by the staff tiers apportioning unit 6. In the above description, the music score displaying data output unit 7 calculates the positioning of the music score notational elements according to the notational elements determining unit 4, the measures apportioning unit 5 and the staff tiers apportioning unit 6. However, the calculations at the measures apportioning units 5 and the calculations of the staff tiers apportioning unit 6 relate closely to the positioning of the notational elements. Therefore, the calculations for the positioning of the notational elements may be conducted by the measures apportioning unit 5 and the staff tiers apportioning unit 6

FIG. 4 shows a block diagram illustrating the hardware configuration of an embodiment of an apparatus for arranging music score displaying data according to the present invention. The example is of a case wherein an application program is installed in a personal computer to perform the function of displaying a music score according to the present invention. As shown in FIG. 4, the apparatus comprises a system bus 21, a CPU (central processing unit), a ROM 23, a RAM 24 and controls 25 such as a keyboard and a mouse for the manipulation by the user. With the application program for displaying a music score, designation of the channel for displaying a music score, designation of the music score display operation, setting of the range of a music score display area, and so forth are conducted by the mouse manipulation. A display circuit 26 is to drive and control the display device 3 to cause a music score to be displayed on the display device 3. Although omitted from the Figure, a printer may be connected as a display device 3 to print a sheet music.

To the system bus 21 is connected a tone generator 27, which in turn is connected to a D/A converter 28, which in turn is connected to a sound system 29 for producing musical performance sounds. An external storage device 30 connected in the system may be an HDD (hard disk drive), an FDD (flexible disk drive), an optical disk drive such as a CD-ROM (compact disc read-only memory), or a semiconductor memory card such as a flash memory. An interface 31 such as a MIDI interface is provided to connect to an external musical device 32 such as an electronic keyboard musical instrument, an electronic keyboard and an external tone generator. The MIDI interface 31 may not necessarily be a dedicated MIDI interface, but may be configured by using a general-purpose interface such as an RS-232C, a USB (universal serial bus) and an IEEE1394.

The musical performance data may be read out from the ROM 22 or from the external storage device 30, or may be inputted from an external musical device 32 such as an electronic musical instrument and stored in a work area of the RAM 24. The musical performance data includes a plurality of MIDI channels individually recognizable for the respective part performances of the music. The music score can be displayed for the designated channel of the musical performance. The music score may be of a combination of performance parts such as a melody part and a chord part by designating plural channels for plural specific performance parts. In such a case, the measures of all the displayed performance parts are aligned vertically as seen in a grand staff or in an orchestra score. In every part performance measure, at least one kind of notational elements shall be placed without an overlap in the horizontal direction.

The format of the performance data of the respective channels may be of any type such as an "event+relative time" type which represents the time point of event by a time lapse from the preceding event, an "event+absolute time" type which represents the time point of every event by an absolute time position from the top of the music piece or the top of each measure, a "note pitch (rest)+duration" type which represents the progression of music by aligning notes, each defined by the pitch and the duration, and rests, each defined by the duration (no pitch), and a "direct memory mapping" type in which memory regions are secured (allotted) for all the available time points under the minimum resolution of time progression for the music and each performance event is written at a memory region which is allotted to the time point for such each event. The performance data includes information with respect to various musical indications such as a key signature and a time signature, and such information will be included in the read-out part performance data for displaying such indications. Even where some indications are missing in the performance data but are required in the displayed music score, the required indications can be obtained by analyzing the performance data, for example, a key signature and a time signature can be known based on the note data and the rest data. Analysis of the number of occurrences of each of the note pitches included in the performance will tell the key of the music progression.

A communication interface 33 is for connecting the apparatus to a server computer or a server station on Internet via a wired or a radio communication network 34, or to a particular server via a LAN or the like network, to receive performance data in real time for a real time performance or to receive a performance data file for download storage or for streaming playback. The tone generator 27 generates tone signals according to the performance data. The generated tone signals are converted to analog waveforms by the D/A converter 28, and are supplied to the sound system 29 to be emitted as audible sounds from the loudspeaker. While the above described configuration includes a tone generator 27, the tone generation can be performed by an external tone generator (not shown) connected via the interface 31 or by the CPU 22 functioning as a software tone generator with an associated tone generation program.

The CPU 22 loads the application program stored in a hard magnetic disk in the external storage device 30 on to the RAM 24 to execute the program steps for arranging music score displaying data and controlling the music score displaying operation. The CPU 22 may transmit the performance data to the tone generator 27 simultaneously for playing back the musical performance. The program for controlling music score display including the music score data arrangement may be used as an independent program, and may be incorporated in a sequencer software program to execute the music score display operation. Such an application program may be supplied from a CD-ROM via the external storage device 30, or may be downloaded from a server on a communication network 34. The apparatus of the present invention can be realized by an electronic musical instrument incorporating a CPU, the hardware configuration being different to some extent. A display screen equipped on the control panel may be used for displaying the notes, or a display of the separate personal computer connected via the interface may be used for displaying the notes.

FIG. 5*a* shows a flow chart describing the process steps for determining the horizontal lengths of the measures under the computer program executed for arranging the music score displaying data according to the present invention, and FIG. 5*b* shows examples of calculations performed in the respective steps of FIG. 5*a*. Frames 51 through 54 in FIG. 5*b* show examples of calculations at steps S41 through 44 in FIG. 5*a*, respectively.

The horizontal length of the music score display area 12 is set at 200 dots as shown in the frame 50. The values shown here are merely for the purpose of examples. As the processing for determining the horizontal lengths of the measures is started, the step S41 calculates the minimum horizontal length necessary for displaying each measure based on the display size (rank #) of the music score notational elements. For example, the horizontal lengths (as shown in FIG. 3*b*) of the notational elements with respect to at least one kind (ex. note, rest, clef, accidental) of notational elements to be contained in each measure are accumulated to obtain the minimum horizontal lengths of the respective measures as shown in the frame 51. Next, in the step S42, the minimum horizontal lengths of the measures are added successively until the sum will not exceed the horizontal length of the staff tier, namely of the music score display area to determine the apportionable number of measures to be contained in each single staff tier such that there would be only a complete measure or measures and not a fractional measure which extends over to the succeeding staff tier. In other words, no single measure would bridge two contiguous staff tiers, as long as the horizontal length of a tier is sufficient for a single measure. Once the apportionment or allotment of measures is determined for a staff tier, the similar successive addition of the element lengths is continued with the next measure placed at the head of the next staff tier so that a further apportionment of measures is determined, and so forth. As would be understood from the frame 52, the addition of the minimum horizontal lengths of measures #1 and #2 results in 148 dots, which does not exceed the horizontal length of the music score which is 200 dots as seen from the frame 50, but the addition of the minimum horizontal lengths of measures #1, #2 and #3 would exceed 200 dots. Accordingly, measures #1 and #2 are apportioned in the first staff tier as shown in FIG. 2. The similar calculation is conducted and measures #3 and #4 are apportioned to the second staff tier.

The step S43 calculates for each staff tier (e.g. the first staff tier to begin with) a justification factor for adjusting the sum of the minimum horizontal lengths of the determined number of apportionable measures (e.g. measures #1 and #2) in each staff tier (e.g. #1) to match with the horizontal length of the staff tier, i.e. the horizontal length of the music score display area 12. As illustrated in the frame 53, with respect to staff tier #1, the sum of the minimum horizontal length of measures #1 and #2 is 148 dots, while the horizontal length of the music score is 200 dots, the calculation resulting in 1.351 . . . . The step S44 multiply, for each measure (e.g. #1) the minimum horizontal length (e.g. 59) of the measure by the justification factor (e.g. 1.351 . . . ) to obtain an adjusted measure length (e.g. 80 dots). With respect to measure #2, the calculation of 89 dots multiplied by 1.351 . . . results in 120 dots. Thus, the justified (i.e. uniformly enlarged) measures #1 and #2 occupy the full length 200 dots of the staff tier.

FIG. 6*a* shows a flow chart describing the process steps for determining the vertical lengths of the staff tiers under the computer program executed for arranging the music score displaying data according to the present invention, and FIG. 6*b* shows examples of calculations performed in the respective steps of FIG. 6*a*. Frames 71 and 72 in FIG. 6*b* show examples of calculations at steps S61 and S62 in FIG. 6*a*, respectively. The processing of FIG. 6*a* to determine the heights of the staff tiers is conducted after the processing of FIG. 5*a* to determine the horizontal lengths of the measures.

The vertical length of the music score display area 12 is set at 300 dots as shown in the frame 70. The values shown here are merely for the purpose of examples. As the processing for determining the heights of the staff tiers is started, the step S61 calculates the highest position and the lowest position of the notational elements to be displayed in each measure, as illustrated in the frame 71. The calculations are conducted according to the vertical positions of the notes and other musical symbols (notational elements). The values of the highest and lowest positions can be expressed with reference to the position of the five-line staff.

The step S62 calculates the highest position and the lowest position of the measures contained in the staff tier under calculation to determine the highest position and the lowest position of the staff tier. For example, the higher of the highest position of measure #1 and the highest position of measure #2 is determined to be the highest position of staff tier #1. Likewise, the lower of the lowest position of measure #1 and the lowest position of measure #2 is determined to be the lowest position of staff tier #1. The difference between the highest position and the lowest position of staff tier #1 makes the height (i.e. maximum vertical length) of staff tier #1. The calculations of the highest position and the lowest position may be conducted directly with respect to each staff tier, omitting the calculations at the step S61. The frame 72 shows that staff tier #1 requires the height of 45 dots, staff tier #2 requires the height of 41 dots, and so forth.

The step S63 is to determine the number (n) of staff tiers apportionable within the music score display area, by calculating the sum of the vertical lengths of "n" staff tiers plus "n−1" times the inter-tier spaces (m5) and find appropriate number "n" so that such a sum shall not exceed the vertical length (300 dots) of the music score display area 12. The vertical justification can also be conducted by changing the inter-tier space value m5, so that the above sum becomes equal to the vertical length 300 dots.

In the above described embodiment, the music score is displayed page by page of the sheet music 11 on the display screen, i.e. in a plurality of pages in the case of a long score. The music score may be displayed in a continuous roll sheet to display the staff tiers contiguously downward to read the score by scrolling the staff tiers. In the case of such a fashion, justification in the vertical direction is unnecessary, as a fractional display of a staff tier at some moment will not matter at all, and only the justification in the horizontal direction should be taken care of. While the above description is made in connection with a display screen, the music score may be printed on sheets of paper using a printer machine.

The above description has been made on the premise that a performance data file for a piece of music is inputted from a RAM or other storage device, but the performance data may not necessarily be stored completely for a piece of music in such a storage device beforehand. The performance data may be supplied in real time and can be processed as music score displaying data and displayed in the form of a music score to the extent the data have been supplied up to that time. In such a processing mode, if the sufficient performance data have not been supplied for the calculation of the measures apportionment or the staff tiers apportionment, a kind of predetermined default values for the horizontal length of a measure and a vertical length of a staff tier may be temporarily used for the calculation to display the music score, and such a temporarily displayed portion of the music score may be revised later little by little or may be rearranged after a sufficient amount of performance data have been supplied. Further, in the case where the audio signals obtained by picking up musical sounds from instrumental playing or human singing are analyzed with respect to the sound frequencies and are converted to performance data to be stored in a storage device, the music score displaying data can be arranged in real time according to the present invention to display the music score on the display device.

While the above-described embodiment of the music score displaying data arranging apparatus relates to a personal computer and an electronic musical instrument, the apparatus may be applicable to a karaoke equipment, a game machine, a portable communication terminal such as a cellphone, an electronic musical system such as a player piano, and so forth. The apparatus may not be an electronic musical instrument having a keyboard and other playing controls, and tone generators, etc., but may be an electronic musical system configured by separate individual devices of required functions interconnected by dedicated MIDI interfaces or other interfaces for various communication networks. For example, some of the functions may be performed by a server on a communication network and some other functions may be performed by a terminal apparatus, thereby constituting an entire system over a network.

As will be understood from the above description, a music score can be displayed with the necessary notational elements without an overlap and without a fractional measure (a measure bridging two staff tiers), the positions of the notational elements being automatically adjusted, even though the sizes of the notational elements is changed by the user's designation.

While particular embodiments of the invention and particular modifications have been described, it will, of course, be understood by those skilled in the art that various modifications and substitutions may be made without departing from the spirit of the present invention so that the invention is not limited thereto, since further modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. An apparatus for arranging music score displaying data for displaying a music score having measures of music progression on a given music score display area of a display device across a plurality of staff tiers, each tier containing one or more measures of variable lengths as justified for the display area, said apparatus comprising:

an input device which inputs data representing a music performance in a plurality of measures of music progression; and a controller comprising:

a music score notational element determining device which determines music score notational elements necessary for displaying on said display area a music score for each of said measures based on the input music performance representing data;

a display size setting device which sets, according to input by a user, individual display sizes of said music score notational elements to be displayed on said display area;

a horizontal length determining device which determines a horizontal length of the music score to be displayed on said display area;

a measure apportioning device which calculates, based on the set display sizes, a minimum horizontal length of each of the measures necessary for placing in each of the measures at least one kind of said music score notational elements, which are determined by the music score notational element determining device, without an overlap in a horizontal, and apportions said measures for each of said staff tiers based on said calculated minimum horizontal length of each of said measures and said determined horizontal length of the music score to be displayed on said display area such that the music score notational elements of each of said measures are placed on the apportioned staff tier in a length of at least said minimum horizontal length, while each of said measures is positioned only on a single staff tier and not spanning across multiple staff tiers; and a music score display data output device which outputs music score display data for displaying on said display area said music score notational elements on said staff tiers according to the apportionment of the measures by said measure apportioning device, wherein a number of measures displayed on each display area page of the display device is determined based on the set individual display sizes.

2. An apparatus as claimed in claim 1, wherein said music score notational elements are notes.

3. An apparatus as claimed in claim 1, wherein said display size setting device includes controls to be operated by a user setting the display sizes of said music score notational elements.

4. An apparatus as claimed in claim 1, wherein the music score is displayed on said display area in the plurality of staff tiers on a page or pages, each page having said music score display area, and wherein said controller further comprises:

a vertical length determining device which determines a vertical length of the music score to be displayed on said display area; and a staff tiers apportioning device which calculates, for each of said staff tiers based on said set display sizes, a maximum vertical length for placing all the music score notational elements in the measures apportioned for the staff tier by said measures apportioning device, and apportions said staff tiers for each page based on said calculated maximum vertical length of each of said staff tiers and said determined vertical length of the music score to be displayed on said display area such that a number of staff tiers is placed within said display area on the page, wherein said music score display data output device outputs music score display data for displaying on said display area the music score for the page by placing the music score notational elements in the staff tiers for which the measures are apportioned by said measure apportioning device according to the apportionment of the staff tiers as apportioned by said staff tiers apportioning device.

5. An apparatus as claimed in claim 4, wherein said staff tiers apportioning device calculates said maximum vertical length by calculating the highest position of an notational element and the lowest position of an notational element among said notational elements to be placed in each of said staff tiers.

6. An apparatus for arranging music score displaying data for displaying a music score having measures of music progression on a given music score display area of a display device across a plurality of staff tiers, each tier containing one or more measures of variable lengths as justified for the display area, said apparatus comprising:

an input device which inputs data representing a music performance in a plurality of measures of music progression; and a controller comprising:

a display size setting device which sets, according to input by a user, individual display sizes of music score notational elements with respect to the measures to be displayed on said display area based on the input music performance representing data;

a measure length calculating device which calculates, based on said set display sizes of the music score notational elements, a minimum horizontal length of each of the measures necessary for placing in each of the measures at least one kind of said music score notational elements without an overlap in a horizontal direction among said music score notational elements to be displayed on said display area;

a measure apportioning device which apportions the measures for each of said staff tiers so that each of the measures to be displayed on said display area is positioned only on a single staff tier and not spanning across multiple staff tiers; and a music score display data output device which outputs music score display data for displaying on said display area said music score notational elements in said measures according to said determined display sizes of the music score notational elements and said calculated horizontal lengths of the measures, wherein a number of measures displayed on each display area page of the display device is determined based on the set individual display sizes.

7. An apparatus as claimed in claim 6, wherein the measure apportioning device adjusts said music score display data such that a music score is displayed with the plurality of staff tiers on said display area on a page-by-page basis, and apportions said music score notational elements to be placed in a uniform distribution through the staff tier with respect to the music progression.

8. An apparatus as claimed in claim 6, wherein said music score notational elements are notes.

9. A computer-readable storage medium storing a computer program executable by an apparatus for arranging music score displaying data for displaying a music score having measures of music progression on a given music score display area of a display device across a plurality of staff tiers, each tier containing one or more measures of variable lengths as justified for the display area, the computer program containing instructions for:

inputting data representing a music performance in a plurality of measures of music progression;

determining music score notational elements necessary for displaying on said display area a music score for each of said measures based on the input music performance representing data;

setting, according to input by a user, individual display sizes of said music score notational elements to be displayed on said display area;

determining a horizontal length of the music score to be displayed on said display area;

calculating, based on the set display sizes, a minimum horizontal length of each of said measures necessary for placing in each of the measures at least one kind of said music score notational elements without an overlap in a horizontal direction among said music score notational elements as determined to be displayed on said display area;

apportioning said measures for each of said staff tiers based on said calculated minimum horizontal length of each of said measures and said determined horizontal length of the music score to be displayed on said display area such that the music score notational elements of each of said measures are placed on the apportioned staff tier in a length of at least said minimum horizontal length, while each of the measures is positioned only on a single staff tier and not spanning across multiple staff tiers; and outputting music score display data for displaying on said display area said music score notational elements on said staff tiers according to the apportionment of the measures made in the apportioning instruction, wherein a number of measures displayed on each display area page of the display device is determined based on the set individual display sizes.

10. A computer-readable storage medium storing a computer program executable by an apparatus for arranging music score displaying data for displaying a music score having measures of music progression on a given music score display area of a display device across a plurality of staff tiers, each tier containing one or more measures of variable lengths as justified for the display area, the computer program containing instructions for:

inputting data representing a music performance in a plurality of measures of music progression;

setting, according to input by a user, individual display sizes of music score notational elements with respect to the measures to be displayed on said display area based on the input music performance representing data;

calculating, based on the determined display sizes of the music score notational elements, a minimum horizontal length of each of the measures necessary for placing in each of the measures at least one kind of said music score notational elements without an overlap in a horizontal direction among said music score notational elements to be displayed on said display area;

apportioning the measures for each of said staff tiers so that each of the measures to be displayed on said display area is positioned only on a single staff tier and not spanning across multiple staff tiers; and outputting music score display data for displaying on said display area said music score notational elements in said measures according to said determined display sizes of the music score notational elements and said calculated horizontal lengths of the measures, wherein a number of measures displayed on each display area page of the display device is determined based on the set individual display sizes.

* * * * *